Feb. 4, 1930.  F. S. MULOCK  1,745,945
PROCESS OF TREATING ORES OR ANALOGOUS MATERIALS
Filed Jan. 8, 1924
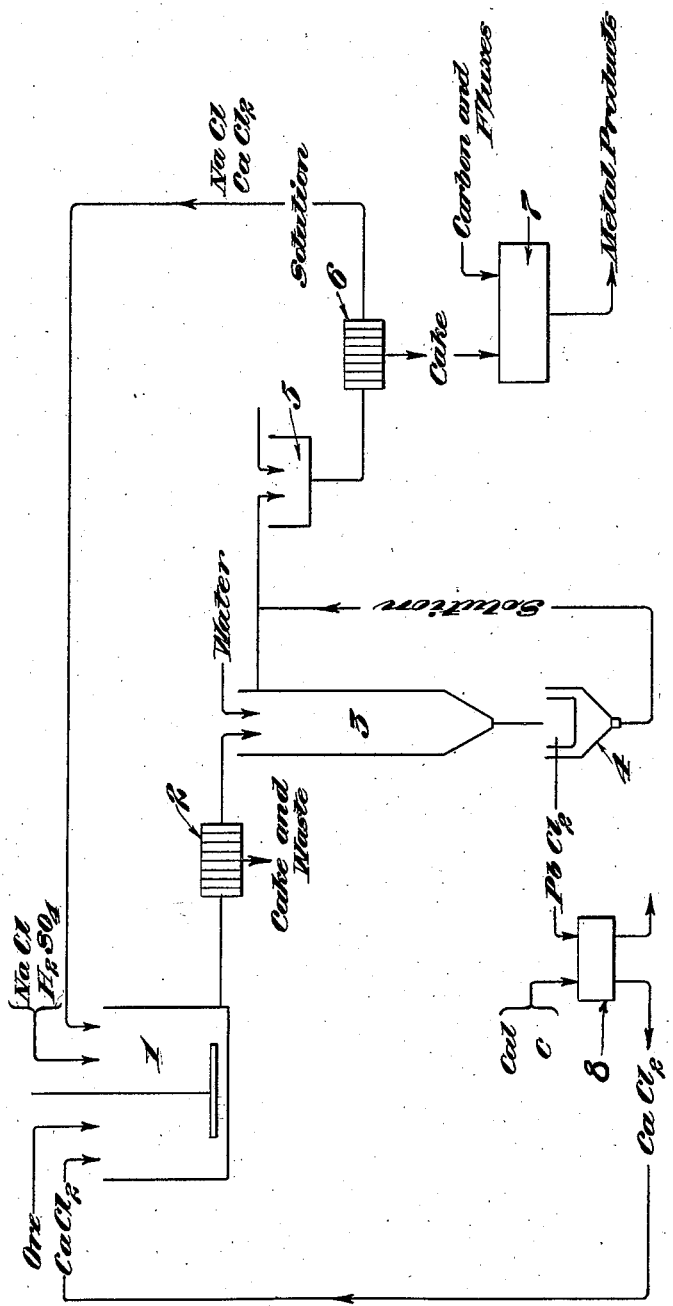

Patented Feb. 4, 1930

1,745,945

UNITED STATES PATENT OFFICE

FRED S. MULOCK, OF BRIGHTON, MASSACHUSETTS, ASSIGNOR TO UNITED STATES SMELTING, REFINING & MINING COMPANY, OF PORTLAND, MAINE, A CORPORATION OF MAINE

PROCESS OF TREATING ORES OR ANALOGOUS MATERIALS

Application filed January 8, 1924. Serial No. 685,009.

The invention relates to a process of treating ores or analogous materials to extract or separate therefrom, and from each other, metal values therein.

The process has been developed more particularly for the recovery of lead, bismuth, copper and precious metals from complex ores, flue dusts from smelting and roasting furnaces, or similar materials containing any or all of such metals. It provides for the separation of the major portion of the lead in a high state of purity from the other metals and also for their recovery.

If sulphide ores are to be treated, they should first be roasted in the usual manner to convert sulphides to sulphates and oxides, since it is desirable that the material to be treated should have as high a percentage of lead sulphate as practical. Flue dusts and similar materials need no preliminary roasting. Zinc, arsenic and antimony, if present in any considerable amount in the material to be treated, should first be removed by any suitable leaching method, as by leaching with dilute sulphuric acid.

In practicing the method, the ore or material to be treated, if not already in a finely divided state, is crushed to the desired fineness and is then treated or leached with a brine acidified with sulphuric or hydrochloric acid and containing sufficient calcium chloride to combine with the soluble sulphates formed by the ensuing solution of the metals. This calcium chloride may be obtained from later steps in the process, any deficiency being added from other sources. The mixture is preferably agitated and the treatment carried on at from 50° to 100° C. An amount of solution and sodium chloride should be used to give a final solution which is practically saturated with lead chloride at the temperature used. The lead sulphate is dissolved in the acid brine and unites with the sodium chloride to form lead chloride and sodium sulphate. The calcium chloride unites with the sodium sulphate to form insoluble calcium sulphate and sodium chloride so that a highly concentrated solution of lead chloride may be obtained, as, for instance, a solution containing 50 grams or more lead per liter at 80° C.

During the treatment with acid brine and calcium chloride, the extraction of lead, bismuth and copper is rapid. The extraction of silver is slower and in some cases it may be found advantageous to agitate the mixture at ordinary temperature for a period before heating. The gold extraction may be improved by the addition of small amounts of ferric chloride.

After sufficient agitation, the solution is separated, as by filtration, without cooling. The solution is then cooled to ordinary temperature or preferably to about zero C. which precipitates the greater portion of the lead as a practically pure lead chloride. Dilution of the solution during cooling with 5% to 25% of its volume by water is advantageous since lead chloride is much less soluble in the diluted brine than in a nearly saturated brine. The lead chloride settles rapidly and completely and may be separated from the solution by centrifuging, filtering or other means. It is then smelted with a slight excess of lime and carbon producing a high grade metallic lead and a calcium chloride slag which may be used in the leaching step previously described. The use of a small percentage of sodium chloride in the smelting operation is advantageous since it lowers the melting point and increases the fluidity of the slag.

The solution containing copper, bismuth and precious metals, if present in the material originally treated, and also containing the remainder of the lead and varying amounts of other metals which may have been present in the materials such as iron, zinc, arsenic, etc., is treated with lime to precipitate these metals as hydroxides or oxides and to produce calcium chloride. In case there is ferrous chloride in the solution, air is preferably blown in during the treatment with lime in order that the iron may be precipitated as the more easily handled ferric hydroxide rather than as the ferrous hydroxide. The precipitate of the metal hydroxides and oxides is smelted with carbon and with fluxes, if necessary, to produce a lead bullion containing the bismuth and precious metals which may be recovered by known methods of treatment. The other metals may be slagged off or volatilized and may be recovered by known methods if in sufficient amount to render such recovery desirable or profitable. The solution which contains sodium chloride and calcium chloride, and possibly small amounts of base metal chlorides, may be made up to the desired strength and used for treatment of the materials in the first step of the process.

The above treatment not only affords an efficient and economical method for extracting the lead and other metals from the materials, but also for the separation and recovery of the bismuth and silver in case there is a substantial amount of bismuth and silver in the materials to be treated. The lead, bismuth and silver are dissolved in the acid brine and the major portion of the lead is precipitated as pure lead chloride so that there will be a comparatively high percentage of bismuth and silver in the lead bullion obtained in the subsequent treatment of the solution. The bullion may therefore be economically treated to recover the bismuth and silver by methods which would be impracticable if applied to bullion containing comparatively low percentages of bismuth and silver.

A flow sheet illustrating the method is shown in the drawings.

As indicated in the flow sheet, the crushed ore or other material to be treated is treated in the tank 1 with brine acidified with sulphuric acid and containing sufficient calcium chloride to combine with the soluble sodium sulphates formed by the solution of the metals in the acid brine and the reaction of the sodium chloride therewith. The amount of chloride required will probably vary between 0.5 and 0.6 pounds of calcium chloride per pound of lead. After being fully agitated within the tank 1 at the temperature from 50° to 100° C., the emulsion or pulp is filtered at 2 without cooling. The solution containing the lead in a highly concentrated form and also containing the bismuth, copper and precious metals is cooled in the tank 3 with or without dilution to throw down the major portion of the lead as lead chloride. After settling, the lead chloride is separated from the mother liquor by centrifuging or other means at 4. The solution from which the greater part of the lead has been removed is treated in the tank 5 with lime to precipitate the other metals and also the remainder of the lead. This precipitate which is in the form of hydroxides or oxides of the metals is separated by filtration at 6, the solution containing calcium chloride and sodium chloride being returned to the tank 1 and the filter cake being smelted with carbon and fluxes at 7 to produce lead bullion which is subsequently treated to recover the metal values.

The lead chloride from 4 is smelted at 8 with lime and carbon to produce metallic lead and calcium chloride slag which is returned to the tank 1.

What is claimed is:

1. The method of treating ores and materials containing minerals, including lead, in the form of sulphates and oxides which consists in leaching with an acid brine containing calcium chloride to secure a highly concentrated solution of lead chloride by removing the sulphate in the form of calcium sulphate.

2. The method of treating ores and materials containing minerals, including lead, in the form of sulphates and oxides which consists in leaching with a warm acid brine containing calcium chloride to secure a highly concentrated solution of lead chloride, separating the calcium sulphate formed from the solution and cooling it to precipitate the lead chloride.

3. The method of treating ores and materials containing minerals, including lead, in the form of sulphates and oxides which consists in leaching with a sodium chloride brine acidified with sulphuric acid and containing sufficient calcium chloride to combine with the soluble sulphates formed by the solution of the metals contained in the materials treated.

4. The method of treating ores and materials containing minerals, including lead, in the form of sulphates and oxides which consists in leaching with a sodium chloride brine acidified with sulphuric acid and containing sufficient calcium chloride to combine with the soluble sulphates formed by the solution of the metals contained in the materials treated, separating the calcium sulphate formed from the solution and cooling the solution to precipitate the lead chloride.

5. The method of treating ores and materials containing minerals, including lead, in the form of sulphates and oxides which consists in leaching with an acid brine containing calcium chloride, separating the calcium sulphate, cooling the solution to precipitate the lead chloride, separating the solution and lead chloride, and smelting the chloride with lime and carbon to secure metallic lead and calcium chloride for use in leaching.

6. The method of treating ores and materials containing minerals, including lead, in the form of sulphates and oxides which consists in leaching with an acid brine containing calcium chloride, separating the calcium sulphate, cooling the solution to precipitate the lead chloride, separating the solution from the chloride, treating it with lime to precipitate the metals as hydroxides or oxides and to regenerate calcium chloride for use in the leaching.

7. The method of treating ores and materials containing minerals, including lead and bismuth, in the form of sulphates and oxides which consists in leaching with an acid brine containing calcium chloride, separating and cooling the solution to precipitate the major portion of the lead as lead chloride, separating the solution from the precipitate and treating it with lime to precipitate the remaining lead, bismuth and other metals, and smelting the precipitate to form lead bullion with a comparatively high percentage of bismuth.

8. The method of treating ores and materials containing minerals, including lead and bismuth, in the form of sulphates and oxides which consists in extracting the lead, bismuth and other metals as chlorides, precipitating the greater part of the lead chloride in the solution, precipitating the remaining lead with the bismuth and other metals, and treating the latter precipitate to form a lead bullion with a comparatively high percentage of bismuth.

9. The method of treating ores and materials containing minerals, including lead, in the form of sulphates and oxides which consists in leaching with an acid brine containing a salt of a metal which forms an insoluble sulphate to secure a highly concentrated solution of lead chloride by removal of the sulphate as an insoluble precipitate.

10. The method of treating ores and materials containing minerals, including lead, in the form of sulphates and oxides which consists in leaching with a chloride solution containing acid and calcium chloride to secure a highly concentrated solution of lead chloride by removing the sulphate in the form of calcium sulphate.

11. The method of treating ores and materials containing minerals, including lead, in the form of sulphates and oxides, which consists in leaching with an acid brine containing calcium chloride to extract the lead and other metals as chlorides and to remove the sulphates, and diluting the solution to precipitate the lead chloride.

12. The method of treating sulphide ores and materials containing minerals, including lead, which consists in roasting to convert the sulphides to sulphates and oxides, leaching with an acid brine containing calcium chloride to secure a highly concentrated solution of lead chloride, separating the calcium sulphate formed from the solution, and removing the lead chloride from the solution.

13. The method of treating sulphide ores and materials containing minerals, including lead, which consists in roasting to convert the sulphides into sulphates and oxides, leaching with a sodium chloride brine acidified with sulphuric acid and containing calcium chloride, removing the sulphate in the form of calcium sulphate, cooling and diluting the solution to precipitate lead chloride, separating the solution from the precipitated lead chloride, treating the solution with lime to precipitate the remaining lead chloride, and using the calcium chloride formed for leaching the sulphates and oxides.

FRED S. MULOCK.